Oct. 22, 1935.   R. C. COLLINS   2,018,604
BICYCLE TIRE
Filed Sept. 12, 1934
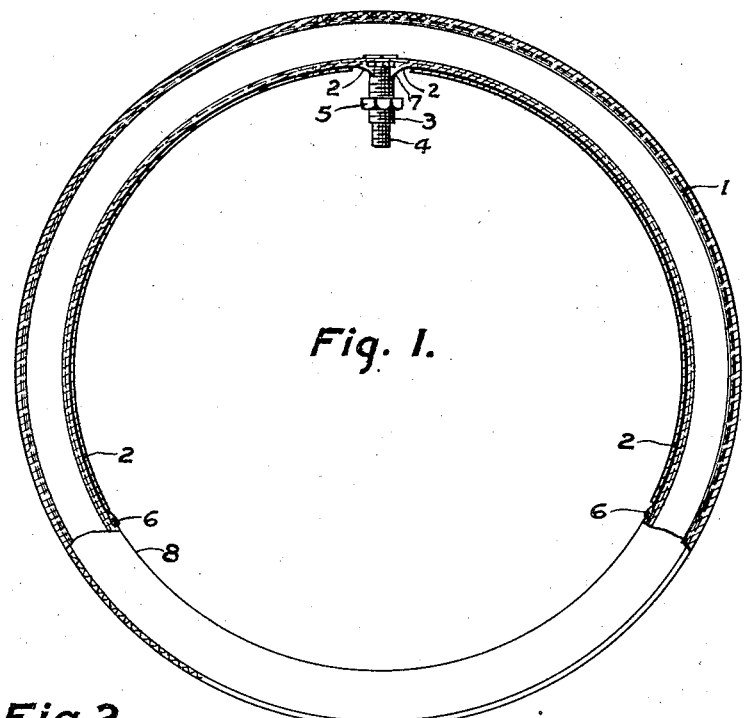
Fig. 1.
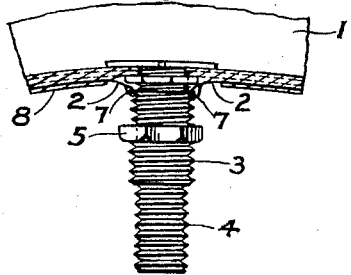
Fig. 2.
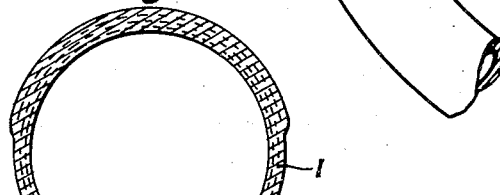
Fig. 3.
Fig. 4.
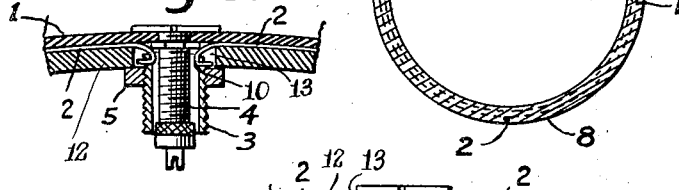
Fig. 5.
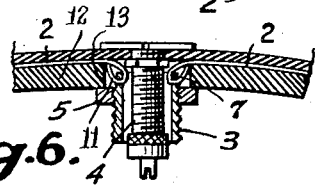
Fig. 6.
INVENTOR Patented Oct. 22, 1935

2,018,604

UNITED STATES PATENT OFFICE 2,018,604

BICYCLE TIRE

Roi Cash Collins, Westfield, N. J.

Application September 12, 1934, Serial No. 743,686

15 Claims. (Cl. 152—6)

My invention relates to improvements in pneumatic, rubber, bicycle tires and has for an object to provide improved bicycle tires that can be fastened securely on bicycle wheel rims without cementing.

At the present time, single tube bicycle tires composed of compounds of rubber and fabric vulcanized together so as to be air tight and embodying an air valve for purposes of inflation and deflation, are fastened to bicycle wheel rims by cementing with glue, shellac or other cementitious material to prevent creeping or movement of the tires on the wheel rims, and to prevent the tires from becoming detached from the wheel rims. Double tube tires are attached to wheel rims by forming a bead on the casings which is accommodated by grooves in the wheel rims. This method is far from perfect and the tires often roll off the wheel rims while in service causing accident and damage.

The method of fastening pneumatic bicycle tires to wheel rims by the use of glue or other cementitious material is objectionable for the following reasons:

(1) The cementitious material is apt to disfigure the finish of the bicycle, the wheel and rim.

(2) The cementitious material is difficult and objectionable to handle, as it soils person and clothing and is difficult to remove therefrom.

(3) The cementitious material is often not available when needed.

(4) The bond of cementitious material often becomes broken between the tire and the wheel rim, allowing the tire to creep or move on the wheel rim, which movement is of sufficient force to tear out the air valve embodied in same, and the tire becomes useless until a costly and difficult repair is made.

(5) Bicycle tires mounted on wheel rims by the cementing method cannot be used immediately because considerable time must elapse for the cementitious material to dry and set.

(6) Bicycle tires mounted on wheel rims by the cementing method eventually become loosened from the rims due to the flexible action of the tire when in use working against the rigid grip of the cementitious material. The tires must then be re-cemented to the wheel rims. When this operation has been carried out several times, the wheel rims and the inner face of the tires become thickly coated with the old, hardened cement and must be cleaned of cement before further re-cementing is attempted, because the tires will not remain in place when the rims and tires are in this condition. The process of cleaning away old, hardened cement from tires and rims is laborious, costly and of great difficulty.

(7) Tires that are fastened to wheel rims by cementing sometimes become loosened suddenly, while in use, and therefore are a source of danger to the user.

(8) Juvenile users of bicycle tires and the like, seldom have cementitious material available, or the knowledge how to use it, to fasten tires and the like to wheel rims. This often necessitates a costly trip to the repair man, and delay.

The method of fastening double tube bicycle tires to wheel rims by the use of tire beads and rim grooves, the so called "clincher" method, is objectionable because it is difficult and sometimes impossible to maintain the tires on the rims when inflated and in use, because of the elasticity of the tire beads. The beads in this type of tire must be elastic so they may be stretched over the wheel rim in mounting. These tires often roll off the wheel rims while in use and therefore are a source of danger and damage.

The object of the present invention is to overcome all of these disadvantages and to provide pneumatic bicycle tires and the like, susceptible of being fastened securely to bicycle wheel rims, in proper relation for use, without the use of cement, shellac, glue or other cementitious material and to provide a positive method of fastening tires of the "clincher" type to wheel rims, and which are;

First, susceptible of being fastened on wheel rims, in proper relation for use, so as to eliminate the possibility of all creeping, or movement of the tire on the wheel rim, and consequent tearing out of the air valves;

Second, which are susceptible of being fastened together, in proper relation for use, by any person unskilled in the art;

Third, which are susceptible of being fastened on wheel rims securely, in proper relation for use, and put into service or use immediately, after proper inflation;

Fourth, which eliminate all dirt and uncleanliness of cementitious material and possible damage to the finish of the bicycle, or any part thereof, and to person, clothing and property, on account of the use of same;

Fifth, which provide greater safety in use and diminishes the possibility of accident from tires which suddenly become loosened and uncemented from wheel rims while in use;

Sixth, which provide pneumatic bicycle tires for combination with wheel rims, and the like, embodying a mechanical bond between them when in proper relation for use;

Seventh, which provide bicycle tires susceptible of being used in a deflated, or partly deflated condition, if necessary, on account of puncture while in use, that will not creep or move concentrically on the wheel rims and tear out the valve stems and will not roll off the wheel rims while in use.

The above, and various other hereinafter detailed and understood objects and advantages of this invention, will be set forth in the following detailed description of the construction of the same, the construction being illustrated in the accompanying drawing, wherein:

Figure 1 is a lateral elevational view of a single tube bicycle tire shown partly in section embodying the features of this invention.

Figure 2 is a fragmentary partly sectional view, slightly enlarged, showing the portion of a single tube bicycle tire embodying the valve stem assembly and embodying features of this invention. (The valve stem cap is not shown in the drawing.)

Figure 3 is a fragmentary view of a single tube bicycle tire shown in perspective embodying features of this invention.

Figure 4 is a cross sectional view of a single tube bicycle tire embodying a feature of this invention.

Figure 5 shows a section of the tire and sleeve with the ends of the wires forming hooks and Figure 6 is a similar view showing the ends of the wires forming eyes.

Referring now to the drawing, and first to Figures 1 and 2, according to my invention the main body portion 1 and air valve 4 of the bicycle tire, are constructed generally in the usual manner according to present common practice but with the addition of threaded metal sleeve 3 loosely fitting over valve stem 4 and connected to wires 2 through holes 7 in sleeve 3. Wires 2 are embedded in main body portion of tire 1 near the inner circumferential surface of same and extend in opposite directions from threaded sleeve 3 partially around the inner circumference of tire 1 and near the surface thereof to fixed connection with body portion of tire 1 at 6—6.

6—6 Figures 1 and 3 are loose tabs or ends of a ply of fabric 8 at or near the inner circumference of body portion of tire 1 which forms an integral part thereof except at ends or tabs 6—6.

Wires 2 may be connected to tabs 6 by piercing through same and being doubled back on themselves and twisted together or by a metal eyelet or grommet through tabs 6 to receive wires 2 formed into hooks at their ends. I prefer to fasten wires 2 to tabs 6 by constructing tabs 6 of two thicknesses or plies eyeletted together and threading the ends of wires 2 through same, bending wires 2 back upon themselves and twisting same together.

Wires 2 are embedded in body portion of tire 1 but are not integral with same being free to move slightly concentrically in relation to tire 1 due to the elasticity of tire 1, when tension is exerted on threaded sleeve 3.

Nut 5, which is threaded similarly to sleeve 3, is used to exert tension on sleeve 3 which transmits same to wires 2.

The connection of wires 2 with upper part of sleeve 3 is made by threading the ends of wires 2 through holes 7 in sleeve 3, bending wires 2 back upon themselves and twisting same together, or by forming hooks on the ends of wires 2 and hooking them into holes 7 in sleeve 3, or by forming eyes in the ends of wires 2 after threading through small holes 7.

In use my invention is applied and operated as follows: Tire 1 is mounted on a bicycle wheel rim when deflated, in the usual manner, by inserting valve stem together with sleeve 3 through the valve stem hole provided in bicycle wheel rims, after first removing threaded nut 5 from sleeve 3, and stretching the remainder of tire 1 over the edge of the wheel rim and into the hollowed portion of same.

Of course the portion of tire 1 embodying wires 2 will not stretch because wires 2 are secured firmly at each end; the stretching action taking place in the remainder of tire 1 which is constructed in the usual manner according to present common practice.

Nut 5 is then threaded on sleeve 3 until it comes in contact with the wheel rim 12. Further turning of nut 5 draws sleeve 3 together with the ends of wires 2 partially through the valve hole through wheel rim, as desired, exerting tension on wires 2 which slightly decreases the diameter of tire 1 due to the elasticity of tire 1. The tension thus exerted on wires 2 is transmitted to body portion of tire 1 along its inner lateral circumference by means of connecting tabs 6.

Further turning of nut 5 further decreases the lateral diameter of tire 1 due to the elasticity of tire 1 causing it to come into extremely close and tight contact with the wheel rim. Tire 1 is then inflated to service pressure and is ready for use.

The friction exerted between tire 1 and the wheel rim as above described is sufficient alone to prevent all creeping and concentric motion of tire 1 in relation to the wheel rim but in addition, threaded sleeve 3 is in contact with the wheel rim at the valve stem hole through same and forms a mechanical bond independently of the valve stem.

Figure 5 shows hooks 10 formed on the ends of the wires 2. Such hooks are intended to engage in the holes 7 in the sleeve 3.

In Figure 6 the wires 2 are formed into eyes 11 after the ends of the wires are threaded through small holes in the sleeve 3.

In Figures 5 and 6 is illustrated the wheel rim 12 having the enlarged opening 13 to admit the sleeve 3. The nut 5 threaded externally on the sleeve engages the wheel rim 12 for the purpose of forcing the rim 3 radially inward to pull tightly upon the wire 2.

While I have shown and described one embodiment of this invention with slight modifications thereof, it will be understood that this has been chosen for the purpose of illustration only, and that I do not desire to be limited to the details of construction shown and described except as defined in the appended claims, for obvious modifications will occur to persons skilled in the art.

Applicant is fully aware that single and double tube pneumatic, rubber bicycle tires and the like have heretofore been constructed. However all of the prior construction known to the applicant does not admit of the manufacture of single and double tube, pneumatic, rubber and fabric, vulcanized bicycle tires for use with bicycle wheel rims and the like, so constructed so as to allow fastening same together, in proper relation for use, without the employment of cementitious material as a bonding agent between the rim and the tire.

I, therefore, do not claim novelty for the invention of a bicycle tire broadly; but

I claim:

1. A pneumatic tire embodying a valve for inflating and deflating same, having an externally threaded metal sleeve and similarly threaded nut, said sleeve loosely mounted on the valve stem and attached to wires extending in opposite directions from the sleeve and loosely embedded in the inner circumferential body portion of the tire, said wires extending circumferentially around a portion of the tire and having their ends fastened to the body portion of the tire on opposite sides of the sleeve substantially as described and as shown on the drawing.

2. A bicycle tire of the single tube type embodying an air valve, having an externally threaded metal sleeve accommodating a similarly threaded nut, the sleeve of a size to fit loosely over the air valve stem and connected at one end to wires extending in opposite directions from the sleeve and embedded in the body portion of the tire, said wires extending circumferentially throughout a portion of the inner circumference of the tire and having their ends attached to the body portion of the tire on opposite sides of the sleeve.

3. A bicycle tire of the single tube type embodying an air valve and valve stem, the valve stem projecting through a loosely fitting, metal sleeve, exteriorly threaded to accommodate a similarly threaded nut, said sleeve attached to the ends of wires extending in opposite directions from the sleeve and said wires loosely embedded in the body portion of the tire on opposite sides of the sleeve and free to move and extending partly around the inner circumference of the tire having their ends opposite the sleeve securely fastened to a ply of fabric comprising a part of the body portion of the tire.

4. A bicycle tire embodying an air valve and valve stem; a loosely fitting, threaded, metal sleeve on said valve stem; a nut threaded on the outside of said sleeve; wires attached to the end of said sleeve nearest the tire and extending in opposite directions from the sleeve partly around the inner circumference of the tire and loosely embedded therein, secured at their ends to the body portion of the tire, substantially as described and as shown on the drawing.

5. A pneumatic tire, a loosely fitting, threaded, metal sleeve around a portion of the valve stem with a similarly threaded nut thereon, wires attached to said sleeve and extending in opposite directions from said sleeve loosely embedded in the body portion of said tire near its inner face throughout a portion of the circumference of said tire, and a means for attaching the ends of said wires to the body portion of the tire.

6. A pneumatic bicycle tire of the type described, in combination with a bicycle wheel and wheel rim, having a loosely fitting, threaded, metal sleeve around the valve stem carrying a similarly threaded nut thereon; wires attached to the end of said sleeve; said wires loosely embedded in the body portion of the tire near its inner face and extending in opposite directions from said sleeve partially around the inner circumference of the tire, opposite ends of said wires securely attached to the body portion of the tire by means of tabs formed at the ends of a ply of fabric integral with the tire.

7. In a pneumatic bicycle tire of the single tube type, a loosely fitting, threaded sleeve surrounding a portion of the valve stem, a similarly threaded nut on said sleeve, holes at the end of said sleeve nearest the tire, wires fastened to said sleeve by means of said holes, said wires extending from said sleeve in opposite directions partly around the inner circumference of the tire and loosely embedded in its body portion throughout the greater portion of their length, said wires fastened at their ends opposite said sleeve to the main body portion of the tire, substantially as described and as shown on the drawing.

8. A pneumatic bicycle tire of the single tube type, embodying an air valve and valve stem, having wires embedded in its body portion near the inner face thereof extending throughout a portion of its inner circumference, each of said wires being attached at one end to the body portion of the tire and being attached at its opposite end to an externally threaded, metal sleeve mounted loosely on the air valve stem, and a similarly threaded nut on said sleeve, said wires extending in opposite directions from the sleeve and attached to the tire on opposite sides of the sleeve substantially as described.

9. A pneumatic tire having an externally threaded sleeve carrying a similarly threaded nut, mounted loosely on the valve stem; holes through one end of said sleeve to receive wires; wires attached to said sleeve by means of said holes, said wires embedded in the body portion of the tire and extending in opposite directions from said sleeve for the greater part of their length near the inner face of the tire, ends of said wires opposite said sleeve secured to the body portion of the tire, substantially as described.

10. A pneumatic, single tube bicycle tire embody an air valve and valve stem, having an exteriorly threaded sleeve mounted loosely on the valve stem carrying a similarly threaded nut, holes in the end of said sleeve nearest the tire, wires threaded through said holes, bent back upon themselves and twisted together to form a fixed connection with said sleeve, said wires loosely embedded in the body portion of said tire and extending throughout a portion of its inner circumference to fixed connection points, said fixed connection points being at tabs formed by free ends of a ply of fabric comprising a part of the body portion of the tire, eyelets in said tabs accommodating wires, said wires extending in opposite directions from the sleeve and attached to the tire on opposite sides of the sleeve.

11. A pneumatic single tube bicycle tire of the type described, with wires embedded in the body portion near the surface of its inner face and extending partly around the circumference of the tire, each of said wires having one end attached to the body portion of the tire and having its other attached to an exteriorly threaded metal sleeve by means of a hole in one end of said sleeve, said sleeve fitting loosely over an air valve stem embodied in the tire and carrying a similarly threaded nut, said wires extending in opposite directions from the sleeve and attached to the tire on opposite sides of the sleeve.

12. A bicycle tire of the single tube type embodying an air valve and valve stem, having a ply of fabric forming a portion of its inner face integral with the body portion of the tire, except at the ends of same, such ends being formed into flaps or tabs with eyeletted holes therein to receive and accommodate wires which are attached to said flaps or tabs by threading same through said eyeletted holes, bending back upon themselves and being twisted together spirally; the remainder of the length of said wires continuing in opposite directions, from their respective flaps or tabs, around the inner circumference of the tire and being loosely embedded therein near its inner face or surface, to an exteriorly threaded sleeve, carrying a similarly threaded nut, loosely mounted on the valve stem, said wires attached thereto by means of threading through holes near the end of said loosely fitting sleeve which is nearest the tire, being bent back upon themselves and being twisted spirally together.

13. In a pneumatic tire having a valve stem through which the tire is inflated and deflated, a sleeve fitting loosely about the valve stem, wires extending partially about the circumference of the tire and having their remote ends affixed to the tire at opposite sides of the sleeve, the proximate ends of the wires being attached to the sleeve, and means to cause the sleeve to move radially of the tire relatively to the valve stem.

14. In a pneumatic tire having a valve stem, a sleeve fitting about the valve stem for movement relatively to the valve stem, means to cause such relative movement of the sleeve, and connecting means between the sleeve and the tire, said connecting means being secured to the sleeve and extending in opposite directions from the sleeve circumferentially of the tire and being affixed to the tire at spaced points.

15. In a pneumatic tire having a valve stem and a rim for the tire through which the valve stem projects, a sleeve loosely fitted about the valve stem, connecting means on opposite sides of the sleeve embedded in the tire and extending partially about the tire, the near ends of the connecting means being affixed to the sleeve, and means reacting between the sleeve and rim for drawing the sleeve radially inward to pull on the connecting means and cause contracting of the tire about the rim.

ROI CASH COLLINS.